United States Patent [19]

Sengoku

[11] Patent Number: 4,937,688
[45] Date of Patent: Jun. 26, 1990

[54] GAIN MARGIN DETECTOR FOR A MEMORY UNIT UTILIZING A SERVO CONTROL LOOP

[75] Inventor: Masaharu Sengoku, Amagasaki, Japan

[73] Assignee: Mitsubishi Denki Kabushiki Kaisha, Tokyo, Japan

[21] Appl. No.: 211,206

[22] Filed: Jun. 24, 1988

[30] Foreign Application Priority Data

Jan. 25, 1988 [JP] Japan .................................. 63-14957

[51] Int. Cl.$^5$ .......................... G11B 33/00; G05B 1/06
[52] U.S. Cl. ........................................ 360/69; 318/632
[58] Field of Search ............. 360/69, 75, 77.02, 77.03, 360/77.04, 77.06; 369/32, 44, 47, 48; 318/632

[56] References Cited

U.S. PATENT DOCUMENTS

| 4,380,737 | 4/1983 | Sanders ................................ 330/134 |
| 4,445,153 | 4/1984 | Fujimoto et al. .................... 360/109 |
| 4,563,775 | 1/1986 | Yokosuka ......................... 330/207 P |
| 4,748,393 | 5/1988 | Fincher et al. ....................... 318/628 |

FOREIGN PATENT DOCUMENTS 207434 6/1986 European Pat. Off. .
58-150519 7/1985 Japan .

Primary Examiner—Aristotelis M. Psitos
Assistant Examiner—David L. Robertson
Attorney, Agent, or Firm—Townsend and Townsend

[57] ABSTRACT

A memory unit which interposes a variable gain amplifier between a servo circuit and an actuator and is provided with means for varying the gain of the amplifier and means for detecting existence of reproduction error by an information reproducing head, so that existence of a gain margin of a servo mechanism is detected on the basis of whether or not a reproduction error exists when the gain of the amplifier is varied, thereby prechecking the existence of gain margin of the servo mechanism to adjust the gain margin, when short, by exchanging parts or reassembling them.

2 Claims, 4 Drawing Sheets

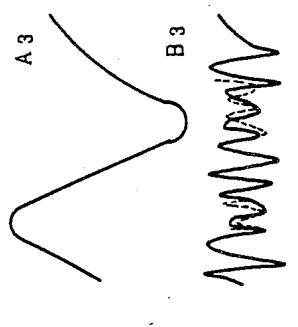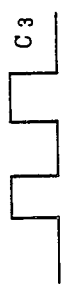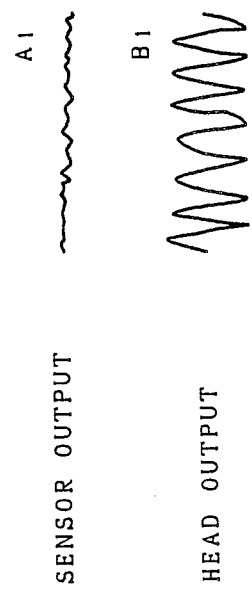
Fig. 4(a)  Fig. 4(b)  Fig. 4(c)
SENSOR OUTPUT
HEAD OUTPUT
ERROR OUTPUT

GAIN MARGIN DETECTOR FOR A MEMORY UNIT UTILIZING A SERVO CONTROL LOOP

BACKGROUND OF THE INVENTION

1. Field of the Invention

The present invention relates to a computer system or a memory unit used for peripheral equipments of the computer, and more particularly to a memory unit detectable of the existence of gain margin of a servo system at a head positioning mechanism for a head of the memory unit.

2. Description of the Prior Art

FIG. 1 is a schematic side view of mechanical structure of a magnetic disc apparatus as an example of the conventional memory unit, which has been disclosed in, for example, the Japanese Patent Laid-Open Gazette No. 60-101777 (1985).

In FIG. 1, reference numeral 1 designates a support base for the entire apparatus, 2 designates a rotor comprising a spindle motor 2M installed on the support base 1 and a rotary shaft 2a for the motor 2M, and 3 designates a disc like recording medium mounted on the rotary shaft 2a, which herein uses a magnetic disc.

Reference numeral 4 designates a head disposed opposite to a recording surface of the recording medium 3, 5 designates a pressure spring for biasing the head 4 toward the recording surface of the recording medium 3, and 6 designates an arm supporting one end of the pressure spring 5.

Reference numeral 7 designates an actuator for moving the head 4 radially of the recording medium 3 so as to position the head 4, the actuator comprising a carriage 8 fixedly supporting one end of the arm 6, a bearing 9 which moves and guides the carriage 8 on the support base 1, a cylindrical coil 10 provided at one end of the carriage 8, a magnet 11 disposed opposite to the coil 10, and a yoke 12 for positioning the magnet 11.

Reference numeral 13 designates a sensor for detecting the position of head 4, which comprises a converter 14 fixed on the support base 1 and an optical linear scale 15 disposed at the carriage 8 side.

A drive control unit at such memory unit has generally been constructed as shown in FIG. 2.

In FIG. 2, reference numeral 16 designates a velocity demodulator which differentially shapes the position information of the head 4 given from the sensor 13 so as to detect the positioning speed of head 4, and 17 designates a servo circuit for driving the actuator 7 while comparing the position information from the sensor 13 given a positioning instruction from a computer 19 with the velocity information from the velocity demodulator 16.

Reference numeral 18 designates a read/write circuit which reads and reproduces the information from the recording medium 3 through the head 4 and writes and stores that in the recording medium 3.

Reference numeral 19 designates a computer which outputs the moving and positioning instruction for the head 4 to the servo circuit 17, or outputs a recording and reproducing instruction to the read/write circuit 18.

Such conventional memory unit operates as follows:

When the moving and positioning instruction is given by the computer 19 to the servo circuit 17, the servo circuit 17 gives to the actuator 7 a positioning signal for the head 4 while fetching from the sensor 13 the present position information of head 4 and from the velocity demodulator 16 the positioning and moving speed of the head 4, thereby moving the head 4 toward a predetermined position and positioning it thereat.

When the head 4 is positioned at the predetermined position, a recording or reproducing instruction is delivered from the computer 19 to the read/write circuit 18 to allow the head 4 to perform recording on the recording medium 3 and the recording medium 3 to reproduce the record, so that the computer 19 is adapted to read out it through the read/write circuit 18.

In the aforesaid conventional memory, the head 4 is positioned with respect to the recording medium 3 by a servo mechanism comprising the servo circuit 17, actuator 7, sensor 13 and velocity demodulator 16, and on the basis of the usual automatic control theory, and the gain margin is required to be over a predetermined value, usually several dB, for stable operation of the servo mechanism.

The actuator 7 and sensor 13 or the like, however, are composed of combination of a plurality of parts respectively, whereby the problem is created in that mechanical resonance is easy to occur due to variation in the parts and assembly thereof, the gain margin is small, the servo mechanism is unstable to cause vibrations, and the head 4 cannot be positioned with accuracy.

SUMMARY OF THE INVENTION

In the light of the above circumstances, the present invention has been designed. An object thereof is to provide a memory unit which prevents a servo mechanism from causing vibrations, thereby enabling a head to be positioned with accuracy with respect to a recording medium.

The memory unit of the present invention is so constructed that between a servo circuit and an actuator are provided a gain variable amplifier, means for changing an amplification gain of an amplifier, and an error detection circuit detecting a reproduction error of the head, so as to detect whether or not the gain margin of the servo mechanism exists on the basis of existence of an output of the error detection circuit when the amplification gain of the amplifier is changed, thereby enabling the gain margin of the servo mechanism to be preconfirmed of its existence.

The above and further objects and features of the invention will more fully be apparent from the following detailed description with accompanying drawings.

DESCRIPTION OF THE PREFERRED EMBODIMENTS

Figure 1:
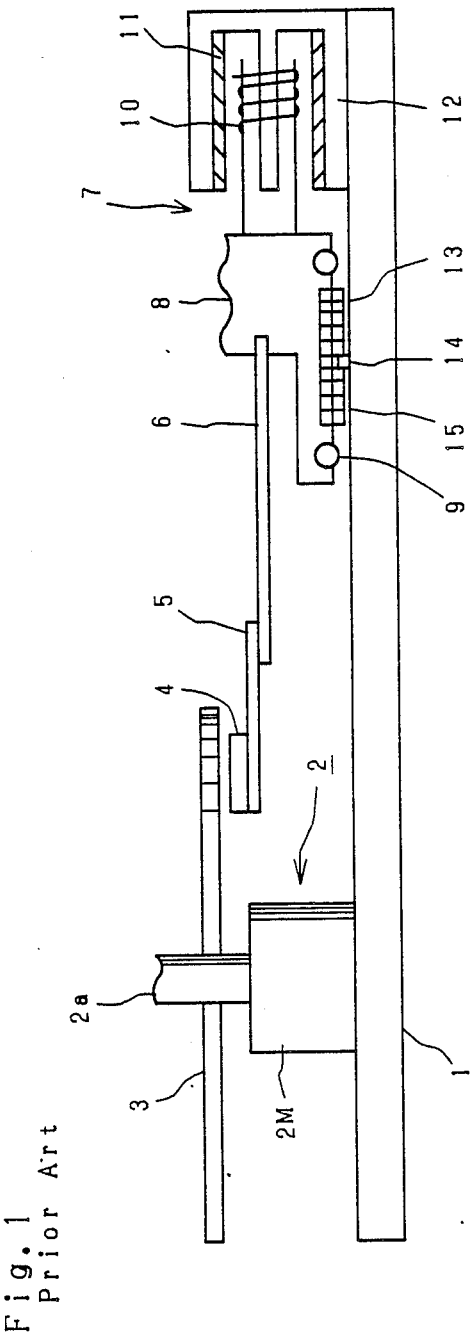
FIG. 1 is a schematic side view showing mechanical construction of the conventional memory unit.

Next, the present invention will be detailed with reference to the drawing showing an embodiment of the invention.

In addition, a mechanical structure portion of a memory unit of the present invention is the same as that of the conventional memory unit shown in FIG. 1. In other words, a disc recording medium 3, concretely a magnetic disc, is mounted on a rotary shaft 2a at a rotor 2 comprising a spindle motor 2M installed on a support base 1 and a rotary shaft 2a at the rotor 2.

A head 4 is disposed opposite to the recording surface of the recording medium 3 and supported on a pressure spring 5 for biasing the head 4 toward the recording surface of recording medium 3, the pressure spring 5 being fixed at one end thereof to a carriage 8 through an arm 6.

Such construction aims at that the pressure spring 5 biases the head 4 toward the surface of the recording medium 3 against buoyancy generated at the head 4 by a viscous air flow created on the surface of the recording medium 3 when the recording medium 3 is rotated by the rotor 2, thereby opposing the head 4 to the recording surface of the recording medium 3 through a minute gap.

The head 4 is positioned by an actuator 7 with respect to the recording medium 3. Concretely, the carriage 8 is provided with a cylindrical coil 10 projecting rearwardly of the carriage 8, the coil 10 being inserted in a cylindrical yoke 12 fixedly supporting a magnet 11. Accordingly, an amount of a current flowing in the coil 10 is changed, whereby the carriage 8 can be moved lengthwise of the coil 10. In other words, the head 4 can seeking-move with respect to the recording medium 3.

Now, it is of course required to detect the relative position of the head 4 to the recording medium 3, so that a sensor 13 for detecting the position of head 4 is provided for this purpose, the sensor 13 comprising a converter 14 fixed onto the support base 1 and an optical linear scale 15 disposed at the carriage 8 side. Hence, when the carriage 8 moves, the optical linear scale 15 moves relative to the converter 14 fixed to the support base 1, whereby the sensor 13 detects the position of the carriage 8, in other words, the relative position of head 4 to the recording medium 3.

Figure 3:
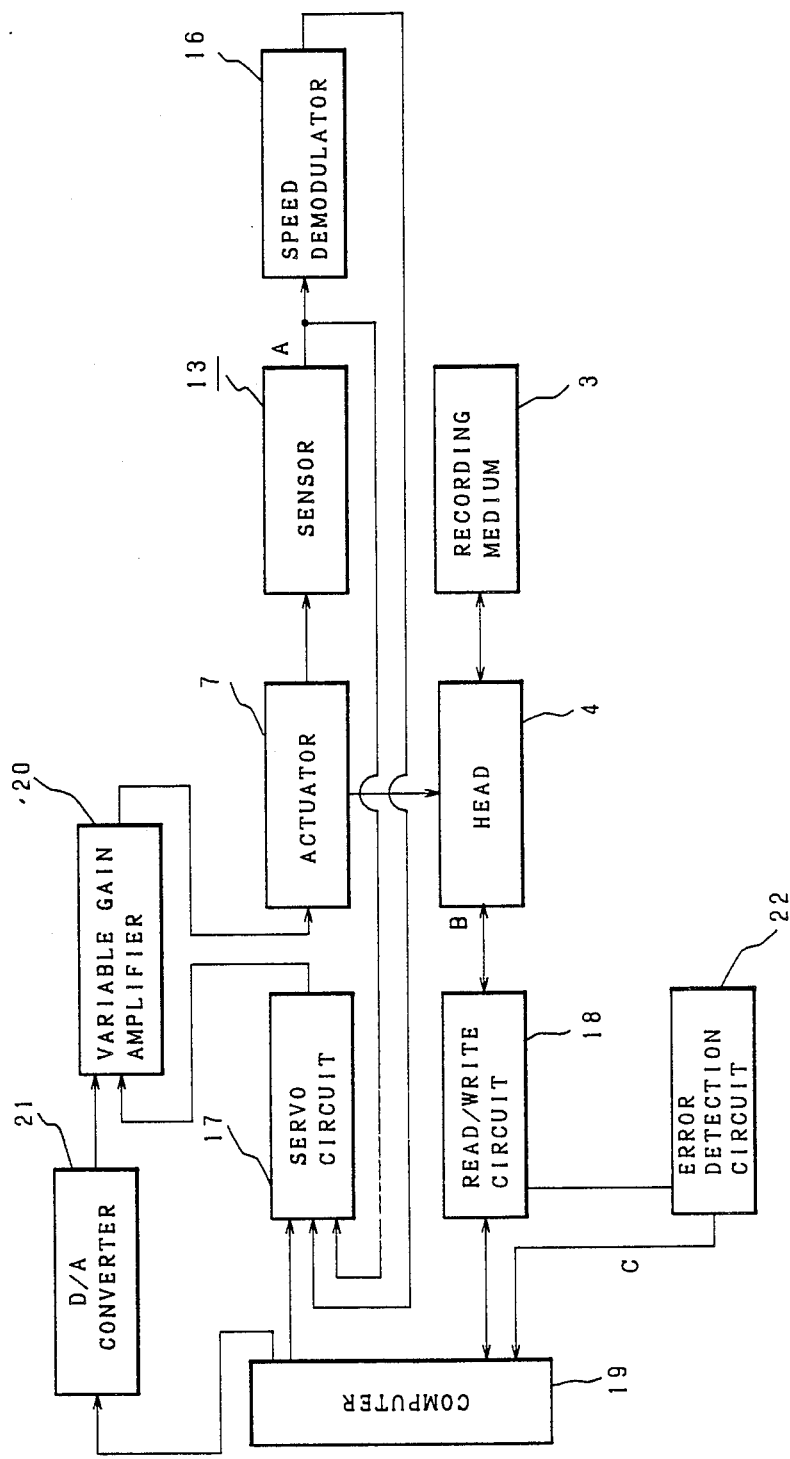
FIG. 3 is a block diagram of a memory unit of the invention, and FIG. 4, consisting of (a)-(c), is a waveform chart when a gain margin of the memory unit is confirmed.

FIG. 3 is a block diagram of a drive control unit of the memory unit of the invention, in which reference numeral 16 designates a velocity demodulator which differentially shapes the position information of the head 4 given from the sensor 13 and detects the positioning velocity of the head 4, 17 designates a servo circuit which drives an actuator 7 while comparing the position information from the sensor 13 given a positioning instruction from a computer 19 with the velocity information from velocity demodulator.

18 designates a read/write circuit which reads the information out of the recording medium 3 through the head 4 and reproduces the information and writes the same in the recording medium 3.

19 designates a computer which outputs to the servo circuit 17 an instruction of movement and positioning of the head 4 and also outputs to the read/write circuit 18 a recording and reproducing instruction.

Figure 2:
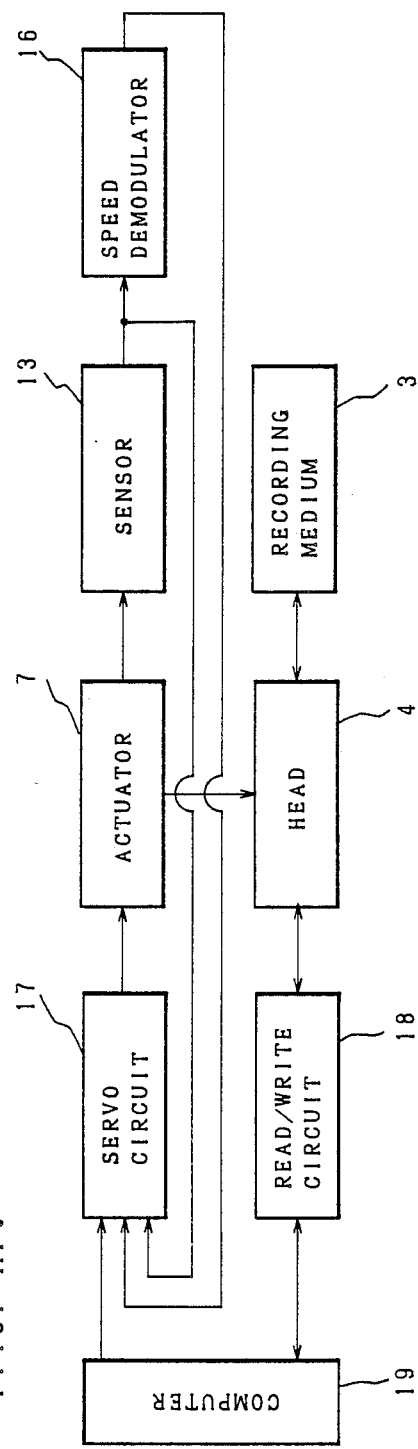
FIG. 2 is a block diagram of a circuit of control system.

The above structure is the same as that of the control system of conventional memory unit shown in FIG. 2, but the memory unit of the invention gives an output of the servo circuit 17 not directly to the actuator but though a variable gain amplifier 20 interposed between the servo circuit 17 and the actuator 7.

The variable gain amplifier 20 is so constructed that the amplification gain with respect to the output signal from the servo circuit 17 to the actuator 7 is made variable following the signal given from the computer 19 through a digital/analog (D/A) converter 21. The amplification gain of the variable gain amplifier 20 is usually set to a predetermined proper normal instruction value given from the computer 19, on the other hand, when the gain margin of the servo mechanism is inspected, the amplification gain is changed to a value larger than the normal instruction value.

The actuator 7 moves the head 4 to the specified position on the surface of recording medium 3 according to the signal given through the variable gain amplifier 20, thereby executing the positioning. After completion of the positioning, the head 4 is given the recording or reproducing signal from the computer 19 through the read/write circuit 18. Hence, the head 4 carries out recording on the recording medium 3, or reproduction of the record from the recording medium 3 to thereby transfer the read-out information to the computer 19.

An error detection circuit 22 is interposed in a parallel manner between the read/write circuit 18 and the computer 19. The error detection circuit 22, when an error occurs in the reproduction information obtained through the head 4 and read/write circuit 18, outputs the error detection signal with respect to the computer 19.

Such memory unit of the invention, when in usual recording or reproduction, outputs an analog signal corresponding to the normal instruction value from the computer 19 to the variable gain amplifier 20 through a D/A converter 21, thereby setting to maintain the gain of the amplifier 20 in the predetermined value. Accordingly, the moving position instruction with respect to the head 4, when issued from the computer 19 to the servo circuit 17, is amplified by a proper gain from the servo circuit 17 on the basis of the outputs of the sensor 13 and velocity demodulator 16 and inputted to the actuator 7 to position the head 4 at the predetermined position, thereby allowing the head 4 to record the information with respect to the recording medium 3 or reproduce the same therefrom.

FIG. 4-(a) shows the output $A_1$ of the sensor 13, that $B_1$ of head 4, and that $C_1$ of error detection circuit 22 when the amplification gain of the variable gain amplifier 20 is set to the normal instruction value, the sensor output $A_1$ and head output $B_1$ are both stable, whereby the error detection signal caused by the servo characteristic of the servo mechanism is never generated from the error detection circuit 22.

Meanwhile, when the characteristic margin of the servo mechanism is checked during the inspection after manufacturing the apparatus or the maintenance and inspection thereafter, the computer 19 issues to the D/A converter 21 an instruction value larger than the aforesaid normal instruction value so as to largely set the gain of amplifier 20, thereby setting a larger gain of the amplifier 20. When the moving position instruction is generated from the computer 19 to the servo circuit 17 and input to the actuator 7 through the amplifier 20 largely setting the gain to thereby position the head 4, the sensor output, head output and error detection circuit output are as that shown in FIG. 4-(b) when the characteristic margin of the servo mechanism is sufficient.

In other words, the sensor output $A_2$ develops some wave motion, the head output $B_2$ also developing vibrations and noises (shown in the dotted line), the error detection circuit 22 does not develop the error detection signal, thereby normally positioning the head 4 with respect to the recording medium 3.

On the contrary, when the characteristic margin of the servo mechanism is not sufficient, the sensor output, head output and error detection circuit output are as that shown in FIG. 4-(c).

In detail, in the servo mechanism of small gain margin, instability is larger to start oscillation so that the sensor output $A_3$ is of oscillatory waveform, the head output $B_3$ is of noise superposed waveform, and the error detection circuit output $C_3$ leads to generation of the error detection signal.

Accordingly, a difference between the aforesaid normal instruction value and the predetermined instruction value larger than that is allowed to correspond to the gain margin of the servo mechanism corresponding to several dB (different by the kind of apparatus, for example, about 5 to 10 dB) and the respective outputs of the error detection circuit 22 are fetched when the computer 19 outputs both the instruction values through the D/A converter 21, thereby enabling the gain margin of the servo mechanism to be confirmed.

When the gain margin is decided to be small, it is possible to adjust the gain margin to be proper by exchanging or reassembling parts of, for example, the carriage 8 constituting the servo mechanism.

In addition, in the aforesaid embodiment, the gain margin for knowing the stability of servo characteristic is confirmed by the computer 19. Alternatively, a phase margin or the like, instead of the gain margin, may be the confirmed object instead of the gain margin, or an electric circuit or a microcomputer provided in a magnetic disc unit, in control unit or between these units.

Also, in the same, the carriage linearly moves, but may be applicable to other positioning drive system, such as swinging or rotating movement.

Furthermore, in the same, the position of the head 4 is detected by the sensor 13, but alternatively the head itself or other heads may detect the position.

Also, in the same, the memory unit uses the magnetic disc unit. Alternatively, the memory unit may of course be applicable to a recording system and a video system using an optical system, a photo-electro-magnetic system, a laser system, an electric field system, a charge system, or the like.

As seen from the above, the memory unit of the invention is provided with the variable gain amplifier and error detection circuit for detecting the reproduction error so as to detect existence of error detection signal from the error detection circuit when changing the gain, thereby enabling the gain margin to be confirmed. Hence, the instability of servo mechanism is prevented and inconvenience that the head cannot be positioned can be eliminated, whereby the memory unit of the invention has the superior effect of largely improving reliability.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within the meets and bounds of the claims, or equivalence of such meets and bounds thereof are therefore intended to be embraced by the claims.

What is claimed is:

1. A fixed disk type memory unit provided with a recording medium which is rotatably driven, a head disposed in communication with the recording medium so as to reproduce information from the recording medium, and a servo mechanism including a head position sensor for detecting a relative position of the head with respect to the recording medium, a servo circuit which generates and outputs a servo signal for positioning the head responsive to the detected relative position provided by the head position sensor, and an actuator lacking vibration when a gain margin is sufficient, the actuator coupled to the servo circuit for moving the head according to a position signal derived from the servo signal, comprising:

a variable gain amplifier, having a first input coupled to the servo signal, a second input for controlling an amplification level of said amplifier, and an output coupled to the actuator, said variable gain amplifier amplifying said servo signal in response to an amplification signal received at said second input to provide said position signal to said actuator;

an error detection circuit, coupled to the head, for detecting a reproduction error in the information reproduced by the head from the recording medium and generating an error signal in response to said detected reproduction error;

a gain setting means, coupled to said variable gain amplifier and producing said amplification signal, for varying and setting a gain of said variable gain amplifier; and means for detecting said error signal when said gain setting means varies the gain of said variable gain amplifier.

2. A method for testing a sufficiency of a gain margin of a servo system having a position of a servo actuator monitored by a position sensor and coupled to a servo control circuit providing a position signal to the actuator to move a read/write head relative to a recording medium, comprising the steps of:

providing a gain setting means, a variable gain amplifier responsive to said gain setting means to increase an amplification level of the position signal provided to the actuator, and an error detecting circuit coupled to the read/write head to output an error signal if data reproduced by said read/write head includes a noise component exceeding a preestablished threshold;

increasing said amplification level of said position signal;

monitoring said error detecting circuit to determine if said error signal is output; and establishing that a gain margin of the servo system is unsatisfactory if said error signal is output and that said gain margin is sufficient if said error signal is not output.

* * * * *